March 20, 1951      K. WILLIAMS      2,546,081
HAND BRAKE HOLDING AND RELEASING MECHANISM
Filed Feb. 27, 1946      2 Sheets-Sheet 1
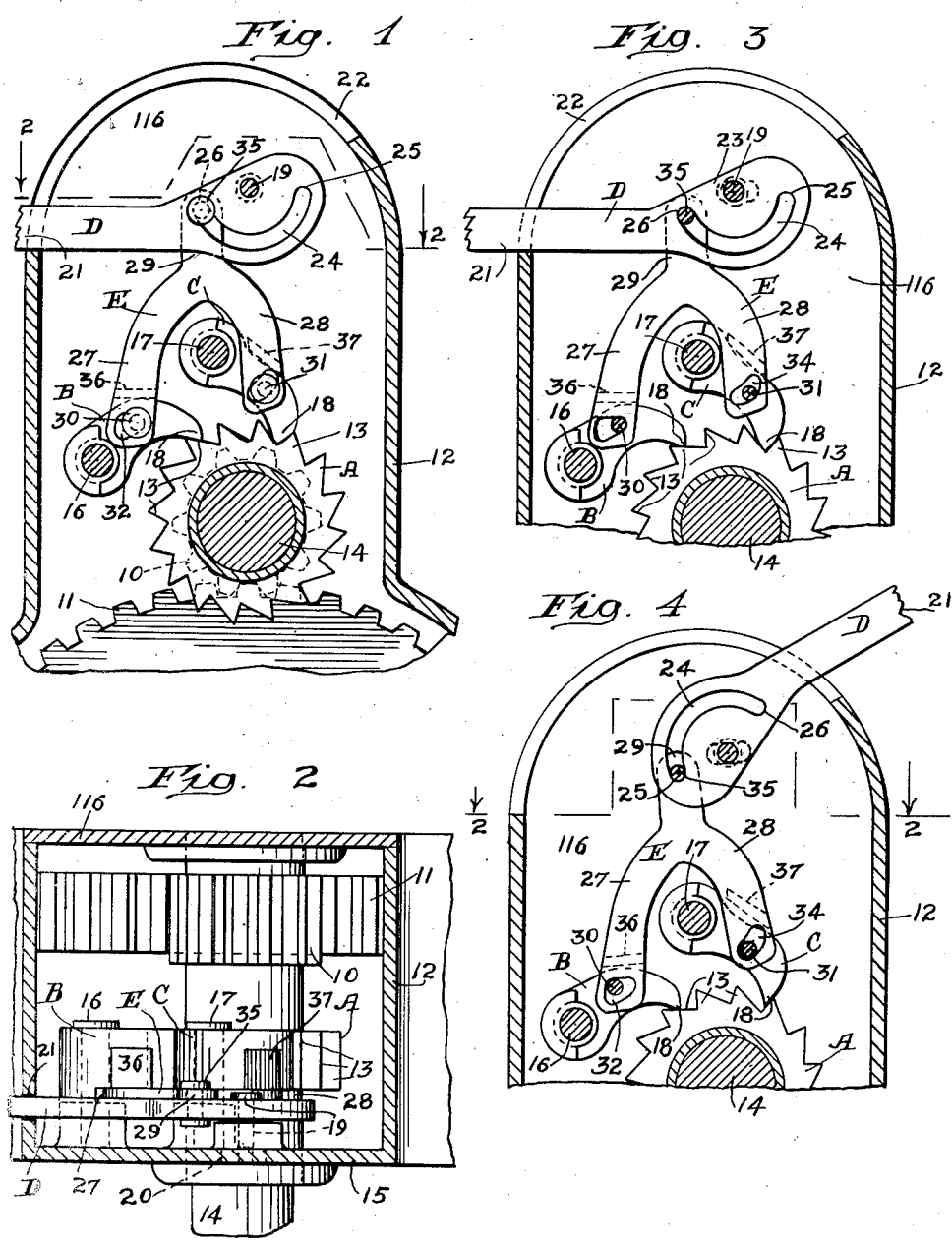
Inventor:
Keith Williams.
By George I. Haight
Atty.

March 20, 1951 K. WILLIAMS 2,546,081
HAND BRAKE HOLDING AND RELEASING MECHANISM
Filed Feb. 27, 1946 2 Sheets-Sheet 2
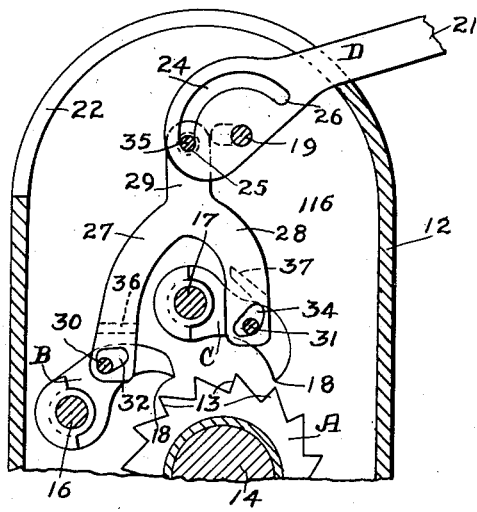
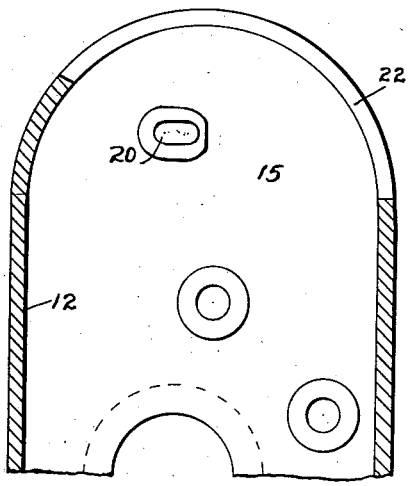
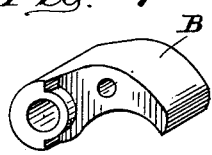
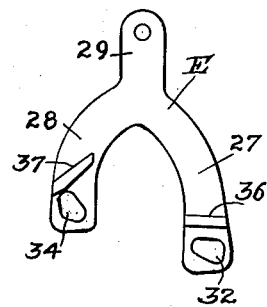
Inventor:
Keith Williams.
By George I. Haight
Atty.

Patented Mar. 20, 1951

2,546,081

UNITED STATES PATENT OFFICE 2,546,081

HAND BRAKE HOLDING AND RELEASING MECHANISM

Keith Williams, Buffalo, N. Y.

Application February 27, 1946, Serial No. 650,530

8 Claims. (Cl. 188—81.1)

This invention relates to improvements in hand brakes for railway cars.

One object of the invention is to provide a hand brake mechanism including a rotary chain-winding member and ratchet means for locking the winding member against movement in brake-releasing direction, wherein the ratchet means comprises a rotary ratchet wheel and a pair of locking dogs having staggered engagement with the ratchet wheel to provide for relatively fine ratcheting adjustment in applying the brakes.

Another object of the invention is to provide a hand brake mechanism of the power-multiplying gear-driven type comprising a rotary brake-tightening element, power-multiplying gear means for driving the tightening element, and ratchet means for locking the brake mechanism against rotation in releasing direction, including a set of two locking dogs having staggered engagement with the teeth of the ratchet wheel to provide for relatively fine holding adjustment, wherein manually-actuated means is provided for throwing the dogs into and out of operative engagement with the ratchet wheel.

A further object of the invention is to provide a hand brake mechanism, as set forth in the preceding paragraph, wherein the manually-actuated means for throwing the dogs into and out of engagement with the ratchet wheel comprises a swinging lever and a yoke member operatively connecting the lever and dogs arranged and designed so that, when the dogs are being thrown into engagement with the ratchet wheel the force acting on the dogs is balanced so that the engagement of each dog is positive.

Other objects of the invention will more clearly appear from the description and claims hereinafter following.

In the drawings forming a part of this specification, Fig. 1 is a transverse sectional view through the upper part of the housing and the enclosed parts of a gear-operated hand brake mechanism, illustrating my improvements in connection therewith. Fig. 2 is a horizontal sectional view, corresponding substantially to the line 2—2 of Fig. 1. Fig. 3 is a view similar to Fig. 1, indicating in dotted lines the location of the guide slot in the front wall of the housing for the pivot of the lever, and showing the pin connection of the yoke with the dogs and lever in vertical section. Fig. 4 is a view similar to Fig. 3, showing the parts in position to effect automatic release of the dogs. Fig. 5 is a view similar to Fig. 3, showing the dogs completely disengaged from the ratchet wheel. Fig. 6 is a transverse, vertical sectional view of the housing looking at the interior side of the front wall of the same. Fig. 7 is a detail perspective view of one of the locking dogs. Fig. 8 is a rear elevational view of the yoke for controlling engagement and disengagement of the dogs.

As illustrated in the drawings, my improvements are employed in connection with a well-known type of power-multiplying gear-driven brake, employing the usual brake drum (not shown) on which the chain is wound, the drum being rotated by a driving pinion 10 actuated by the hand wheel of the brakes (not shown) and meshing with the gear 11 which is rotatable with the winding drum. The parts of the brake mechanism are contained within the usual housing, which is indicated by 12.

My improved hand brake mechanism proper comprises broadly a ratchet wheel A rotatable with the driving pinion of the power-multiplying gear brake, a set of two locking dogs B and C cooperating with the ratchet wheel, an actuating lever D, and a link E connecting the lever to the dogs.

The ratchet wheel A is of the usual type having a set of peripheral teeth 13 and is fixed to the shaft 14, which also has the pinion 10 fixed thereto, and is actuated by the usual hand wheel which is located on the shaft exteriorly of the housing. The shaft 14 has its opposite ends journaled in the usual manner in the front and rear walls 15 and 16 of the housing.

The locking dogs B and C are supported above the ratchet wheel, being pivoted at their inner ends on headed pins 16 and 17 which are fixed in the front wall of the housing. Each dog has a tooth 18 at its outer end which engages with the teeth of the ratchet wheel. As shown in Figs. 1 to 5, inclusive, the dog B is located to the left of the ratchet wheel A at a lower level than the dog C. The parts are designed so that the teeth 18—18 of the dogs B and C have staggered engagement with the teeth of the ratchet wheel A, that is, when one of the two teeth 18—18 is in holding engagement with one of the teeth 13 of the ratchet wheel, the other of said two teeth will be midway between two adjacent teeth 13—13 of said wheel, as shown in Figs. 1 and 2, so that the locking means formed by the two dogs B and C is capable of arresting backing-up movement of the ratchet wheel at intervals corresponding in number to double the number of teeth employed on the ratchet wheel. As will be evident, this arrangement provides for relatively fine adjustment in holding the brakes against release, without any reduction in size, ruggedness, or strength of the individual teeth of the ratchet wheel. With the construction described, I am enabled to obtain relatively fine locking adjustment and all attendant advantages thereof without in any way reducing the strength of the ratchet wheel which would necessarily occur through reduction in size of the teeth thereof if the number of teeth were increased to produce the same result in connection with the usual single locking dog.

The operating lever D is swingingly supported above the dogs B and C on a pivot pin 19 which extends through the lever and is guided in a relatively short horizontal slot 20 in the front wall 15 of the housing. The handle portion of the lever D, which is indicated by 21, extends through a slot 22 provided in the top wall of the housing and is accommodated in said slot for swinging movement. The pivoted lower end of the lever is enlarged, as shown, providing a head member 23. The head member 23 has an arc-shaped guide slot 24 therein, for a purpose hereinafter pointed out. The opposite end walls of the slot 24 provide abutment shoulders or stops 25 and 26.

The link E is in the form of a fork-like yoke member having spaced depending arms 27 and 28 which are curved away from each other, and an upstanding stem 29 at the upper or closed end of the forked portion. The arm 27 is connected at its lower end to the dog B by a laterally projecting headed pin 30 on said dog. The pin 30 is fixed to the dog between the ends thereof and extends into and is accommodated for slight movement in a substantially triangular opening or slot 32 in the lower end of said arm. The arm 28, which is shorter than the arm 27, is connected at its lower end to the dog C by a laterally projecting headed pin 31 on said dog. The pin 31 is fixed to the dog between the ends thereof and extends into and is accommodated for slight movement in an opening or slot 34 in the lower end of the arm 28. As shown, the slot 34 is curved and the width of the same exceeds the diameter of the pin 31 so that the latter has slight lateral play in the slot. The top end of the link or yoke E is operatively connected to the lever D by a headed laterally projected pin 35 fixed in the stem 29 of the yoke and extending through and working in the curved slot or guideway 24 of the head of the lever. The arm 27 of the link or yoke E has a projecting web or lug 36 on the side thereof adjacent to the dog B, which is transversely disposed and overhangs the dog to engage the top side thereof and positively depress the same when the yoke E is depressed. The arm 28 of the yoke is also provided with a projecting web or lug 37 on the side thereof adjacent to the dog C. The web or lug 37 is transversely disposed at an inclination and overhangs the dog C to engage the top side thereof and positively depress this dog when the yoke E is depressed. The link or yoke E thus operatively connects the lever D to the dogs B and C and controls the positions of said dogs with respect to the ratchet wheel, the dogs being moved toward the ratchet wheel when the lever is swung in one direction and being withdrawn from said wheel when the lever is thrown in the reverse direction. The slot 24 of the lever D provides a lost-motion connection and the shoulders 25 and 26 at opposite ends of the slot are adapted to engage the pin 35 of the yoke to respectively lift and depress the yoke and the dogs which are connected thereto.

The operation of my improved ratchet hand brake mechanism is as follows: As the brakes are being applied by rotation of the shaft 14 and the ratchet wheel A in clockwise direction, as viewed in Figs. 1 and 3, the dogs B and C ratchet over the teeth 13 of the wheel, both dogs being yieldingly urged against the teeth of the wheel by the added weight of the lever D, the shoulder 26 of which bears on the pin 35 of the yoke E, in the position shown in said figures, transmitting the force through the yoke to both of the dogs by shouldered engagement of the flanges 36 and 37 with said dogs. As the dogs B and C ratchet over the teeth of the wheel A, they alternately come into locking position with respect to said teeth. Assuming that the brake has been set with either the dog B or the dog C fully engaged with the ratchet wheel, and it is desired to release the brakes, the attendant swings the lever D to the right, thereby forcibly withdrawing both dogs B and C from engagement with the ratchet wheel, as shown in Fig. 5, the yoke or link E being lifted by the shoulder 25 of the lever D engaging the pin 35 of the yoke, and the dogs in turn being swung upward on their pivots by the upward movement of the yoke through shouldered engagement of the arms of the latter with the pins 30 and 31 of the dogs. As will be evident, the weight of the lever D holds both dogs disengaged until the lever is thrown back manually to the position shown in Figs. 1 and 3 with the shoulder 26 of the lever bearing on the pin 35 of the yoke E. Throwing the lever to this last-named position forcibly engages the dogs B and C with the ratchet wheel, the slot and pin connections of the yoke and dogs and the play of the pivot pin 19 of the lever D in the slot 20 afford the required flexibility to permit full engagement of one or the other of the dogs with the ratchet wheel, that is, full engagement of the dog, the tooth of which registers with the opening between two adjacent teeth of the ratchet wheel in its stopped position. In other words, the dog C will be fully engaged, as shown in Fig. 1, when the ratchet wheel is at rest in the position shown in that figure, and the dog B will be fully engaged with the ratchet wheel in the event that the wheel comes to rest in a position with the teeth thereof disposed so that the dog C does not register with the opening between two adjacent teeth.

When the brake is being tightened by rotation of the ratchet wheel A, the dogs B and C being staggered with reference to the teeth of the ratchet wheel will alternately drop into holding engagement with said teeth, thus effectively locking the ratchet wheel against reverse rotation at intervals of advance of said wheel corresponding to one-half of the amount of rotation thereof required to advance the same one tooth, thereby permitting the brakeman to tightly set the brakes even when the resistance encountered is too great to allow the ratchet wheel to be advanced an amount corresponding to one tooth thereof.

In addition to providing for forcible manual disengagement of the dogs B and C from the ratchet wheel by operation of the lever D, automatic disengagement thereof is accomplished in the following manner: With the ratchet wheel locked against rotation, for example as shown in Figs. 1 and 3, the lever D is thrown to the right from the position shown in Fig. 1 until the shoulder 25 of the lever bears against the underneath side of the pin 35 of the link or yoke E. In this position of the lever, the weight thereof exerts upward pressure on the pin 35, tending to lift the yoke and the attached dogs. Upon slight rotation of the ratchet wheel in direction to tighten the brakes, the pressure on the tooth of the particular dog which is fully engaged with the ratchet wheel, is relieved, freeing the dog to be automatically withdrawn from engagement with the ratchet wheel by the weight of the lever D.

I claim:

1. In a hand brake mechanism, the combination with a member adapted to be rotated to effect tightening of the brake; of a ratchet wheel rotatable with said member, said wheel having a plurality of ratchet teeth; a pair of pivoted dogs having staggered engagement with the teeth of said ratchet wheel; a swinging lever; and link means operatively connected at its upper end to said lever to be actuated thereby, said link means having a pair of spaced depending arms operatively connected at their lower ends to said dogs respectively.

2. In a hand brake mechanism, the combination with a member adapted to be rotated to effect tightening of the brake; of a ratchet wheel rotatable with said member, said wheel having a plurality of ratchet teeth; a pair of pivoted locking dogs having staggered engagement with the teeth of said wheel; a swinging actuating lever pivoted at its inner end; a fork-shaped yoke member having spaced depending arms pivotally connected at their lower ends respectively to said dogs, said yoke member being operatively connected at its upper end to said lever.

3. In a hand brake mechanism, the combination with a member adapted to be rotated to effect tightening of the brake; of a ratchet wheel rotatable with said member; a pair of pivoted dogs, engageable with said ratchet wheel; a swinging operating lever; and link means having a lost-motion connection with said lever, said link means being anchored to said dogs for throwing the same into and out of engagement with the ratchet wheel when said lever is swung in reverse directions.

4. In a hand brake mechanism, the combination with a member adapted to be rotated to effect tightening of the brake; of a ratchet wheel rotatable with said member, said wheel having a plurality of ratchet teeth; a pair of pivoted dogs having staggered engagement with said ratchet wheel; a link pivotally connected to both dogs; an abutment at the upper end of said link; and a lever for lifting and depressing said link, said lever being pivoted at its inner end for swinging movement and having circumferentially spaced shoulders at said pivoted end, respectively engageable with said abutment of the link to raise and depress said link as the lever is swung in reverse directions to engage the dogs with and disengage the same from said ratchet wheel.

5. In a hand brake mechanism, the combination with a member adapted to be rotated to effect tightening of the brake; of a ratchet wheel rotatable with said member, said wheel having a plurality of ratchet teeth; a pair of pivoted dogs having staggered engagement with said ratchet wheel; an upstanding link anchored to both dogs at its lower end, said link having a laterally projecting lug at its upper end; and a swinging lever for lifting and depressing said link, said lever being pivotally supported at its inner end and having circumferentially spaced shoulders at said inner end, respectively engageable with said lug of the link to raise and depress the latter and move said dogs away from and toward said ratchet wheel.

6. In a hand brake mechanism, the combination with a member adapted to be rotated to effect tightening of the brake; of a ratchet wheel rotatable with said member; a pair of dogs pivoted at their inner ends and having teeth at their outer ends engageable with said ratchet wheel; a laterally projecting pin on each dog between the ends thereof; an upstanding fork-shaped yoke having spaced depending arms, said arms having bearing openings at their lower ends, within which said pins are loosely accommodated; a laterally projecting lug at the upper end of the yoke; and a lever pivoted at its inner end for swinging movement, said lever having an arc-shaped slot at the pivoted end thereof within which said lug is engaged, the opposite end walls of said arc-shaped slot presenting shoulders respectively engageable with said lug to lift and depress the yoke to move said dogs toward and away from said ratchet wheel when the lever is swung in reverse directions.

7. In a hand brake mechanism, the combination with a member adapted to be rotated to effect tightening of the brake; of a ratchet wheel rotatable with said member, said wheel having a plurality of ratchet teeth; a pair of dogs pivoted at their inner ends and having teeth at their outer ends engageable with said ratchet wheel; an upstanding link anchored to said dogs to lift the latter out of engagement with the ratchet wheel when said link is lifted; laterally projecting flanges on said link overhanging the upper sides of said dogs and being engageable therewith to depress said dogs when said link is depressed; and a swinging operating lever for lifting and depressing said link, said lever being pivoted at its inner end and having a lost-motion connection with said link.

8. In a hand brake mechanism, the combination with a member adapted to be rotated to effect tightening of the brake; of a ratchet wheel rotatable with said member, said wheel having a set of peripheral ratchet teeth; a swinging lever above said ratchet wheel; a pivot member extending through the inner end of said lever, said pivot member being laterally displaceable to a limited extent, said lever having an arcuate slot at said inner end; a pair of pivoted dogs cooperating with said ratchet wheel; a yoke member having spaced depending arms and an upstanding stem at its upper end, said stem having a laterally extending lug engaged with said arcuate slot and adapted to shoulder against the opposite end walls of said slot to operatively connect said lever to said yoke member to be lifted and depressed by swinging movement of said lever in reveres directions, said arms having shouldered engagement with said dogs respectively, to lift and depress said dogs when said yoke member is lifted and depressed.

KEITH WILLIAMS.

REFERENCES CITED

The following references are of record in the file of this patent:

UNITED STATES PATENTS

| Number | Name | Date |
|---|---|---|
| 300,216 | Chisholm | June 10, 1884 |
| 1,199,612 | Rice | Sept. 26, 1916 |
| 2,188,521 | Zane | Jan. 30, 1940 |
| 2,427,389 | Dath | Sept. 16, 1947 |
| 2,463,344 | Williams | Mar. 1, 1949 |